United States Patent [19]
Lowenschuss et al.

[11] 3,852,746
[45] Dec. 3, 1974

[54] PULSE COMPRESSION RADAR

[75] Inventors: Oscar Lowenschuss, Goleta, Calif.; Rob Roy, Elnora, N.Y.

[73] Assignee: Raytheon Company, Lexington, Mass.

[22] Filed: Nov. 14, 1972

[21] Appl. No.: 306,499

[52] U.S. Cl. ........................................ 343/17.2 PC
[51] Int. Cl. ............................................. G01s 9/233
[58] Field of Search ................. 343/17.2 PC; 332/10

[56] References Cited
UNITED STATES PATENTS
| | | | |
|---|---|---|---|
| 3,515,990 | 6/1970 | Robertson | 324/77 |
| 3,680,104 | 7/1972 | Westaway | 343/17.2 PC |
| 3,680,105 | 7/1972 | Goldstone | 343/17.2 PC |

Primary Examiner—Maynard R. Wilbur
Assistant Examiner—G. E. Montone
Attorney, Agent, or Firm—Philip J. McFarland; Joseph D. Pannone

[57] ABSTRACT

An improved digital technique for generating a chirp modulation signal for a pulse compression radar is shown. A stored set of digital numbers having a minimum number of different absolute values of successive samples of the desired modulation signal is processed through a logic circuit to derive a second set of complex digital numbers describing such modulation signal; such second set is then converted to an analog signal which is taken as the chirp modulation signal.

3 Claims, 2 Drawing Figures

PULSE COMPRESSION RADAR

BACKGROUND OF THE INVENTION

This invention pertains generally to pulse compression radar and particularly to improved apparatus for generating a modulation signal in the transmitter of such a radar.

It is well known in the art that the modulation signal for the transmitted pulse from a pulse compression radar may be a frequency modulated, or "chirp," pulse. Such a pulse may be generated using any one of a number of known analog devices. For example, dispersive delay lines, LC filters or voltage controlled oscillators may be used to generate a desired chirp pulse. Any uncompressed echo signal (which obviously is similarly modulated to the transmitted pulse) received by the radar may then be processed, either by comparison with a delayed replica of the transmitted chirp signal or by correlation in a matched filter, to derive a compressed echo signal. While pulse compression radar systems using analog devices have been rather widely used, great care must be taken in their design and operation if the well known shortcomings of analog devices are to be avoided.

It has been proposed, in order to obviate the difficulties encountered when analog devices are used in a pulse compression radar, to generate the chirp pulse by digital techniques. Unfortunately, however, known approaches of such nature require that a relatively large number of digital numbers (representative of samples of the chirp pulse to be generated) be stored. That is, to meet the well known Nyquist criterion, many digital numbers must be stored in a memory to permit generation of a chirp pulse having a time-bandwidth product which equals, or exceeds, that of a chirp pulse produced by known analog chirp pulse generators.

SUMMARY OF THE INVENTION

Therefore, it is a primary object of this invention to provide an improved digital technique for generating a chirp pulse to modulate the carrier signal transmitted by a pulse compression radar.

Another object of this invention is to provide an improved digital chirp pulse generator in which the number of digital numbers required to be stored in a memory is a minimum.

These and other objects of this invention are attained by: (1) selecting, as the modulation signal for the transmitted pulse in a pulse compression radar, a chirp pulse having a desired time-bandwidth product, the length and bandwidth of such pulse being so related that, upon sampling at the Nyquist rate by a set of sampling signals, the value of the resulting set of samples may be expressed by a relatively small set of complex digital numbers; (2) providing storage means for the real and imaginary portions of the set of complex digital numbers; (3) providing logic means for selectively reading real and imaginary portions of the stored set of complex digital numbers; of form, at the Nyquist rate, a new set of digital numbers corresponding to the set of samples of the chirp pulse; (4) converting the set of digital numbers to an analog signal corresponding to the desired chirp pulse; and (5) modulating a radio frequency carrier signal with such chirp pulse.

BRIEF DESCRIPTION OF THE DRAWINGS

For a more complete understanding of this invention, reference is now made to the accompanying description of a preferred embodiment as illustrated in the attached drawings, in which.

DESCRIPTION OF THE PREFERRED EMBODIMENTS

Figure 1:
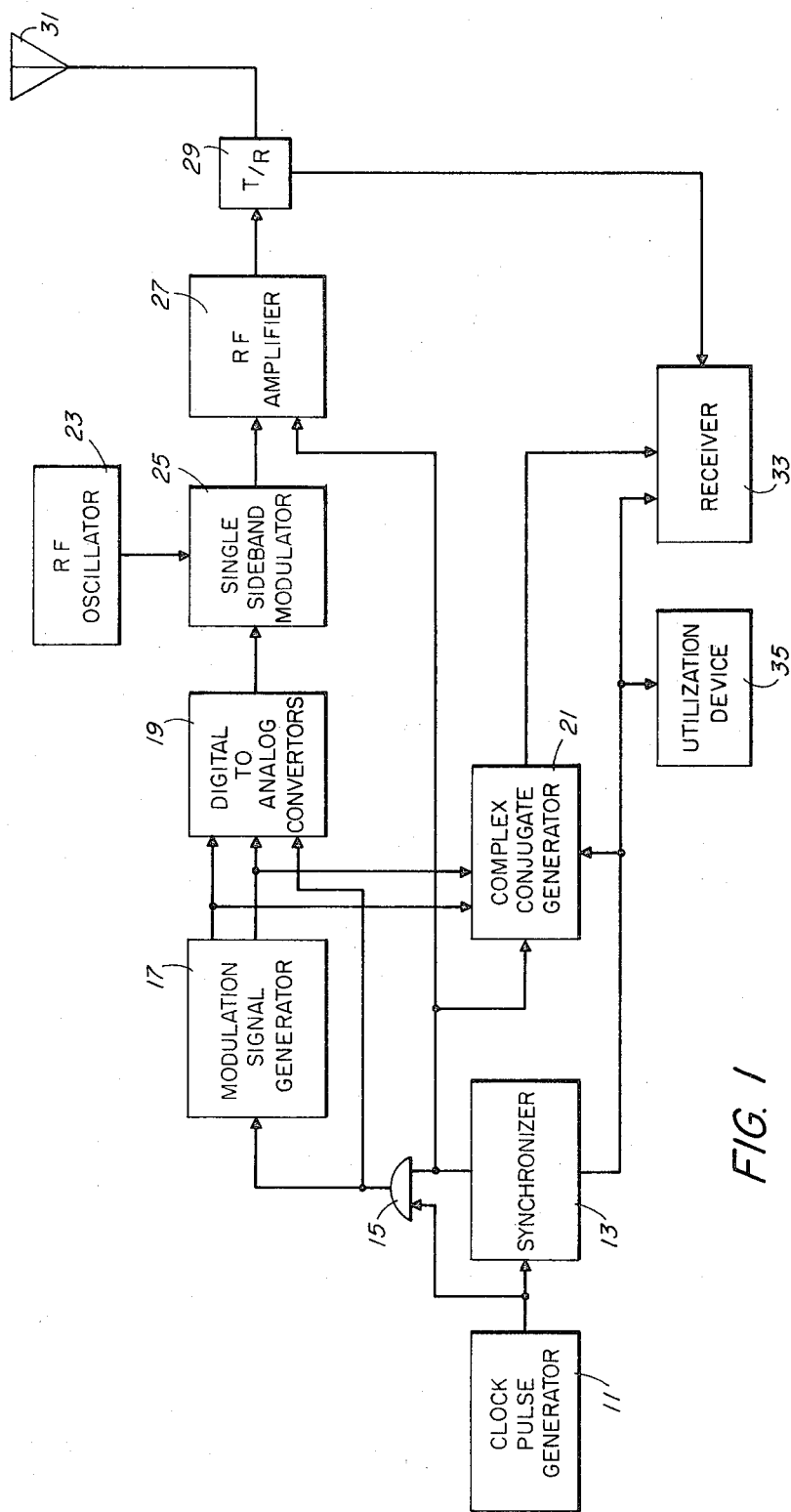
FIG. 1 is a block diagram, somewhat simplified, showing the relationship of the contemplated modulation signal generator to the other parts of a pulse compression radar.

Referring now to FIG. 1, it may be seen that a pulse compression radar using an embodiment of our modulation signal generator may be quite conventional in organization. Thus, a clock pulse generator 11 is provided to produce clock pulses, at, say, a 10 MHz rate (the Nyquist rate for the particular modulation signal to be generated). The clock pulses are fed to a synchronizer 13 and to an AND gate 15. The former, which preferably is conventional, counts down the clock pulses to produce "transmit" gates at the chosen pulse repetition frequency and range gates in a well known fashion. One transmit gate, having a time duration equal to $N \cdot t$ seconds, (where N is the number of samples of the modulation signal and t is the time between successive clock pulses) enables AND gate 15. It follows, then, that a set of "N" clock pulses is passed to a modulation signal generator 17 (described in detail hereinafter in connection with FIG. 2). Suffice it to say here that that element produces, by combining stored digital numbers in a manner to be described, a set of N complex digital numbers indicative of N successive samples of the desired modulation signal. Such set is fed to digital-to-analog converters 19 (also described hereinafter in connection with FIG. 2) and to a complex conjugate generator 21. The latter, for example, may consist of a Discrete Fourier Transform, (DFT), a multiplier to form the complex conjugate of the DFT by reversing the sign of the quadrature (or imaginary) portion of each term of the DFT and a register to store the complex conjugate until an echo signal to be compressed is received. The signals out of the digital-to-analog converters 19 (which signal is the desired modulation signal) is impressed on a carrier signal produced by an R.F. oscillator 23 by operation of a conventional single sideband modulator 25. The so modulated signal, i.e., the chirp pulse, then is passed through a gated R.F. amplifier 27 and a transmit/receive switch, TR 29, to an antenna 31. Echo signals from targets (not shown) received by the antenna 31 pass through the TR 29 to a receiver 33. Preferably, the latter includes, in addition to conventional radio frequency and intermediate frequency sections and range gating means, a quadrature detector to produce, for any selected echo signal, an "in phase," or "real" component and a "quadrature," or "imaginary" component to be passed through a matched filter. Such a filter may include an analog-to-digital converter for each signal component to convert N samples thereof to a set of digital numbers, a DFT to derive the Fourier Transform of the set of digital numbers, a digital multiplier to cross-correlate the Fourier Transform of the selected echo signal with the complex conjugate of the transmitted chirp pulse, i.e. the output of the complex conjugate generator 21, appropriate weighting circuitry, an inverse Discrete Fourier Transform (IDFT) and a digital-to-analog converter. The compressed analog signal out of such a filter may then be passed to a utilization device 35, as an indicator.

Figure 2:
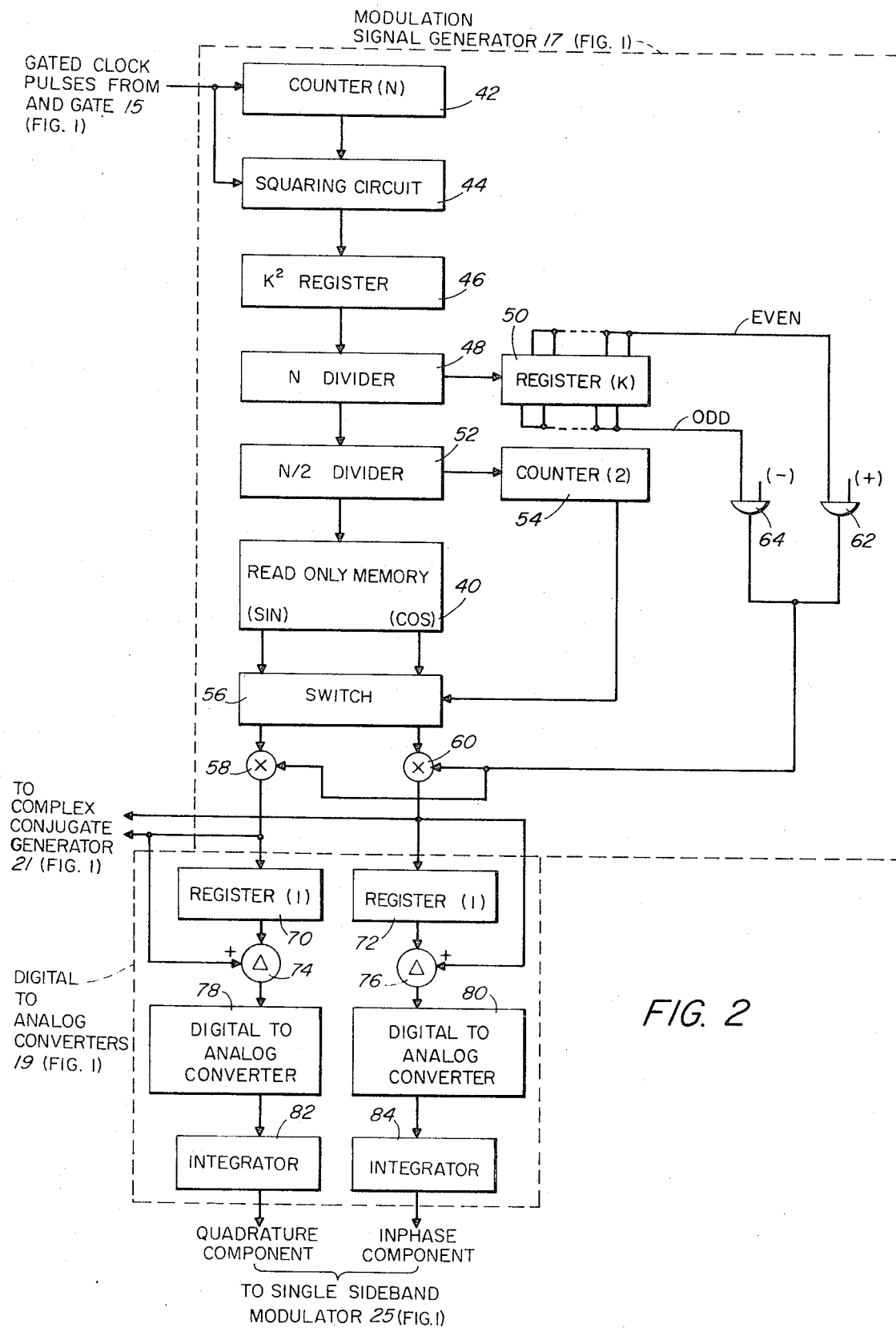
FIG. 2 is a block diagram illustrating the manner in which the elements of the modulation signal generator of FIG. 1 may be connected.

Before referring to FIG. 2 in detail, it is desirable first to review the mathematical considerations involved in converting a set of complex digital numbers to an analog pulse having a linear rate of change in frequency. The equation of such a waveform may be expressed as:

$$s(t) = \exp(j\,\pi\Delta f t^2/T_S) \qquad 1.$$

where $\Delta f$ is the change in frequency from beginning to end of the pulse; and $T_S$ is the length of the pulse.

If such a waveform is sampled at uniform time intervals, T, equal to the Nyquist rate, then the frequency of the $k$th sample may be expressed as $$s(kt) = \exp[j\,\pi k^2 T/T_S] \qquad 2.$$

where $k = 1, 2, 3 \ldots N$

The compression ratio, N, is, by definition equal to the number of complex digital numbers and to $$N = T_S/T \qquad 3.$$

Substituting Eq. (3) in Eq. (2):

$$s(kt) = \exp[j\,\pi k^2/N] \qquad 4.$$

The ratio $K^2/N$ may be expanded into the form:

$$k^2/N = I + k_1/2 + R_k/N \qquad 5.$$

where $I =$ integer (0, 1, 2 . . . . . .)

$k_1 = 0$ or 1

$R_K =$ remainder

Substituting in Eq. (5), the $k^{th}$ sample then is:

$$S(kT) = \pm [1 + k_1(j-1)]\exp[j\,\pi R_k/N] \qquad 6.$$

where the + sign is taken if I is even and the − sign if I is odd.

If now N is chosen to equal:

$$N = 3 \cdot 2^x \qquad 7.$$

where $x$ is a positive integer, it may be shown that there are a relatively few number of different remainders. For example, if N equals 96, there are but seven different remainders as illustrated in TABLE 1.

TABLE 1

| k | $k^2$ | $k^2/N$ | $S(kT)$ |
|---|---|---|---|
| 1 | 1 | 1/96 | $W_1$ |
| 2 | 4 | 4/96 | $W_2$ |
| 3 | 9 | 9/96 | $W_3$ |
| 4 | 16 | 16/96 | $W_4$ |
| 5 | 25 | 25/96 | $W_5$ |
| 6 | 36 | 36/96 | $W_6$ |
| 7 | 49 | ½ + 1/96 | $jW_1$ |
| 8 | 64 | ½ + 16/96 | $jW_4$ |
| 9 | 81 | ½ + 33/96 | $jW_7$ |
| 10 | 100 | 1 + 4/96 | $-W_2$ |
| 11 | 121 | 1 + 25/96 | $-W_5$ |
| 12 | 144 | 1 + ½ | $-j$ |
| 13 | 169 | 1 + ½ + 25/96 | $-jW_5$ |
| 14 | 196 | 2 + 4/96 | $W_2$ |
| 15 | 225 | 2 + 33/96 | $W_7$ |
| 16 | 256 | 2 + ½ + 16/96 | $jW_4$ |
| 17 | 289 | 3 + 1/96 | $-W_1$ |
| 18 | 324 | 3 + 36/96 | $-W_6$ |
| 19 | 361 | 3 + ½ + 25/96 | $-jW_5$ |
| 20 | 400 | 4 + 16/96 | $W_4$ |

This, in turn, means that to solve Eq. (6) when N equals 96, only seven different complex numbers are required, plus and minus signs and the factor "$j$" simply representing phase angles. If follows now that the remainders may conveniently be expressed as cosine and sine values in digital form.

Referring now to FIG. 2 it may be seen that the modulation signal generator 17 (FIG. 1) according to this invention to solve Eq. (7) comprises a read-only memory 40 in which digital numbers representative of the sine and cosine of certain remainders are stored together with logic, to be described, to combine the different ones of the stored digital numbers to generate a set of digital numbers representative of the chosen number of samples of the chirp pulse to be generated. The logic includes a counter 42 having a capacity equal to N, such counter being fed each time a chirp pulse is to be generated by the gated clock pulses through AND gate 15 (FIG. 1). It will be appreciated then that the count of the counter 42 at any time corresponds to the number of sample, $k$, in the chirp pulse. The count in the counter 42 is squared in a squaring circuit 44 and the resulting number is stored in a register ($K_2$ register 46). The contents of the latter register are passed to a module N circuit (N divider 48). The integral part of the quotient of the signal out of the N divider 48 is fed to a register $(k)^{50}$. The remainder out of the N divider 48 is fed to a module N/2 circuit (N/2 divider 52). The integral part of the quotient from the N/2 divider 52 is fed to a counter (2) 54 and the remainder is fed to the read only memory 40 to address that element. The digital numbers read out of the read only memory 40 in accordance with the applied address signals are passed at each clock pulse to an electronic switch 56. This switch is actuated when the counter (2) 54 is full so that the digital numbers out of the read only memory 40 are switched between a pair of digital multipliers 58, 60, i.e. the "sine" and "cosine" values are interchanged. The second input to each one of the digital multipliers 58, 60 is determined by the state of the register 50. Thus, if that register indicates an even integer, AND gate 62 is enabled thereby permitting a +1 to be impressed on the digital multipliers 58, 60. On the other hand, if register 50 indicates an odd integer, AND gate 64 is enabled thereby causing a −1 to be impressed on the digital multipliers 58, 60. Therefore, as the gated clock pulses from AND gate 15 (FIG. 1) are impressed on the counter (N) 42, the result is that different ones of the digital numbers stored in the read only memory 40 are extracted therefrom and combined as required into a set of complex numbers with the sign of the components adjusted as required to create a set of complex digital numbers representative of N successive samples of the chirp pulse. Such digital numbers are fed to the complex conjugate generator 21 (FIG. 1) as shown and also to the digital-to-analog converters 19 (FIG. 1) now to be described.

The digital-to-analog converters 19 include registers 70, 72, each operating to delay each number out of the modulation signal generator by one clock pulse. Each such delayed number is fed to a differencing circuit 74, 76 wherein it is subtracted from the next succeeding digital number out of the modulation signal generator 17. The difference digital number is then fed to a conventional digital-to-analog converter 78, 80. The analog voltage out of each of the just mentioned converters is fed to an integrator 82, 84. It will now be recognized that the output of the integrators 82, 84 are the "in phase" component and the "quadrature" component of the chirp pulse. Such components taken together then are the chirp pulse which is fed to the single band modulator 25 (FIG. 1) as the desired modulation signal.

Having described one embodiment of this invention, it will now be obvious to one of skill in the art that many changes may be made without departing from our inventive concepts. For example, the number of samples, N, need not be 96. That is, in equation (7), $x$ may be any positive integer (other than 1), depending upon the time-bandwidth product desired with a given sampling rate. Further, the logic for determining the remainders, particularly the logic for calculating the value $k^2$, may be changed to a conventional squaring circuit. It is felt, therefore, that this invention should not be restricted to its disclosed embodiment but, rather, should be limited only by the spirit and scope of the appended claims.

What is claimed is:

1. A modulation signal generator in the transmitter of a pulse compression radar, such generator being responsive to a set of N clock pulses at the Nyquist rate, where "N" equals $3.2^x$ and "x" is a positive integer greater than "1," to produce a set of "N" complex digital numbers descriptive of a desired modulation signal and comprising:
   a. a read only memory having stored therein a set of digital members representing the possible absolute values of the in phase and quadrature components of the complex digital numbers to be produced;
   b. selection means, responsive to each successive one of a set of "N" clock pulses, for selecting "N" pairs of digital numbers in the read only memory corresponding to the absolute values of the in phase and quadrature components of successive ones of the complex digital numbers to be produced and for generating a digital representation of the sign of each one of such components; and
   c. a pair of digital multipliers for combining the selected in phase and quadrature components with a digital representation of sign to produce, at the Nyquist rate, the set of "N" complex digital numbers.

2. A modulation signal generator as in claim 1 wherein the selection means includes:
   a. a counter, responsive to successive clock pulses, for producing a different count signal for each successive clock pulse;
   b. addressing means, responsive to each different count signal, for addressing the read only memory to derive the absolute values of the in phase and quadrature components of successive ones of the complex digital numbers to be produced; and,
   c. logic means, responsive to the addressing means, for selecting a digital representation of $-1$ for every odd clock pulse and a digital representation of $+1$ for every even clock pulse and for reversing the addressed in phase and quadrature components to the digital multipliers after every N/2 clock pulse.

3. A modulation signal generator as in claim 2 wherein the addressing means includes:
   a. means for squaring each different count signal out of the counter;
   b. a modulo-N divider, responsive to each squared count signal, for producing a remainder varying between a 0 and N for each count signal to actuate the logic means;
   c. a modulo-N/2 divider, responsive to the remainder out of the modulo-N divider, for producing an address for the read only memory.

* * * * *